United States Patent [19]

Laidlaw

[11] Patent Number: 5,114,032

[45] Date of Patent: May 19, 1992

[54] PLUG FOR SEALING PRESERVATIVE IN WOOD

[76] Inventor: Willam S. Laidlaw, 975 Milner Avenue, Victoria, British Columbia, Canada, V8X 3N5

[21] Appl. No.: 657,850

[22] Filed: Feb. 20, 1991

[30] Foreign Application Priority Data

Oct. 12, 1990 [CA] Canada .................... 2027427

[51] Int. Cl.$^5$ ............................... B65D 39/08
[52] U.S. Cl. .................... 215/356; 215/247; 220/229; 47/57.5; 217/95
[58] Field of Search ........... 217/110, 107; 220/307, 220/288, 289, 229; 215/356, 247; 138/89, 90; 47/57.5; 422/292, 300

[56] References Cited

U.S. PATENT DOCUMENTS

| | | |
|---|---|---|
| 1,999,458 | 4/1935 | Hollister . |
| 2,099,370 | 11/1937 | Monnier ............... 215/247 |
| 2,436,291 | 2/1948 | Daniel ................ 215/247 X |
| 2,492,176 | 12/1949 | O'Connor .............. 220/288 X |
| 3,221,920 | 12/1965 | Buys ..................... 220/288 |
| 3,487,442 | 12/1969 | Rossman ................ 220/288 |
| 3,589,550 | 6/1971 | Rossman ................ 220/288 |
| 3,834,075 | 9/1974 | Nix et al. ............. 47/57.5 |
| 3,944,114 | 3/1976 | Coppens ................ 220/288 |
| 3,968,594 | 8/1974 | Kawakami . |
| 4,005,799 | 2/1977 | Mannaerts ............. 220/288 |
| 4,643,825 | 2/1987 | Weslowski ........... 220/288 X |
| 4,724,793 | 9/1986 | Sletten . |
| 4,833,824 | 5/1989 | Cronenwett et al. ..... 47/57.5 |

Primary Examiner—Stephen Marcus
Assistant Examiner—Paul A. Schwarz
Attorney, Agent, or Firm—Bull, Housser & Tupper

[57] ABSTRACT

The invention provides a plug for sealing substances in holes drilled in wood. The plug has a body of generally circular cross section and a thread portion helically wound around the body between inner and outer end portions thereof. The thread portion has a leading face facing towards the inner end portion and a trailing face facing towards the outer end portion, the leading face being inclined at a shallower angle to a central axis of the body than the trailing face. The plug can be driven into the hole by hammering, but is extracted from the hole by unscrewing in a normal manner. The thread portion is designed to permit relatively easy movement into the hole without rotation, but requires rotation for extraction from the hole. Preferably, the thread portion is flexible and the thread portion is within a shallow conical periphery. The outer end portion has a recess to receive a complementary driver to rotate the plug for extraction.

26 Claims, 2 Drawing Sheets

PLUG FOR SEALING PRESERVATIVE IN WOOD

BACKGROUND OF THE INVENTION

The invention relates to a plug for sealing substances in holes drilled in wooden structures, particularly for sealing wood preservative in holes drilled in standing wood utility poles.

Exceedingly large numbers of standing wooden poles are used by power and communications utilities. To prolong the life of these poles, wood preservative is injected into holes drilled in the pole, which tends to reduce the spread of rot within the pole. Usually, the first internal rot treatment is applied after the pole has been in service for a number of years, and additional treatments are applied at regular intervals. The holes drilled into the wood structures are usually sealed with wooden dowels or plugs which are hammered into the holes after the treatment. When additional treatment is required the wood plugs are removed from the hole, and this can present some difficulty. The dowel can be damaged when being removed from an opening, and commonly it cannot be reused, and thus another dowel is required. Also, old wooden dowels split, and can fall from the opening with the risk of contaminating the immediate area with wood preservative, which can be highly toxic. After many years, the utility pole may have been treated several times, and each time a separate hole might be required, each hole having a separate plug. Installation and maintenance of many plugs is time consuming, and also increases the risk of inadvertent loss of a plug from an opening.

It is known to provide specially adapted threaded plugs to plug openings in treated poles or trees. Typical examples are found in U.S. Pat. Nos. 3,968,594 issued to Kawakami and 4,724,793 issued to Sletten. Both of these patents disclose tapered plugs having threads on the outer periphery thereof, with a central opening extending through the plug. An orifice is provided adjacent the thread or tip of each plug, the orifice communicating with the central opening of the plug to distribute chemicals into the wood. It would appear that both these plugs are fabricated from a rigid material, and require screwing in and screwing out, which can be a time consuming process.

SUMMARY OF THE INVENTION

The invention reduces difficulties and disadvantages of the prior art by providing a threaded plug which can be quickly inserted into an opening in a tree by hammering, and can be quickly removed therefrom by unscrewing to permit re-application of preservative, after which the plug can be reused. The plug has a particular type of flexible thread which permits insertion of the plug into the opening by an axial force such as hammering, and also permits removal of the plug from the opening by unscrewing. This reduces damage to the hole and the plug, and permits the same plug to be reused in the same hole. Preferably, the plug is made from a flexible plastic which provides natural flexibility to the threads and is relatively low-cost to produce and resistant to deterioration when exposed to the chemicals, sun-light and the normal environment of utility poles.

A plug according to the invention comprises a body portion, at least one thread portion, and a driver engagement means. The body portion has a central longitudinal axis, inner and outer end portions, and a periphery of generally circular cross-section extending between the end portions. The thread portion is helically wound around the periphery, and has a leading face facing toward the inner end portion, and a trailing face facing toward the outer end portion. The leading face and trailing face are inclined to the longitudinal axis at a leading angle and a trailing angle respectively, the leading angle being shallower than the trailing angle. The driver engagement means is for co-operating with a driver and is located adjacent the outer end portion of the plug.

Preferably, the thread portion is flexible and has a directional flexibility so as to deflect relatively more easily towards the outer end portion than towards the inner end portion. In one embodiment the periphery is a portion of a shallow angled cone, with the inner end portion being of smaller diameter than the outer end portion. In another embodiment, the thread depth is greater at the outer end portion of the plug than at the inner end portion. In one embodiment, the driver engagement means is a recess within the outer end portion, the recess having at least one pair of diametrically opposed shoulder portions to accept driving faces of the driver.

Particularly for wood having a flat surface, a circumferential, non-helical annular sealing ring is provided adjacent the outer end portion, the ring extending outwardly to provide a maximum diameter of the plug to augment sealing. In another embodiment, the body has a longitudinal opening extending between the inner and outer end portions thereof, and a penetrable sealing means extends across the opening so as to seal the opening when closed. Preferably, the sealing means is resilient and has a self-sealing opening therein in which resilience of the sealing means maintains the opening closed.

A detailed disclosure following, related to drawings, describes a preferred embodiment of the invention which is capable of expression in structure other than that particularly described and illustrated.

DETAILED DISCLOSURE

Figure 1:
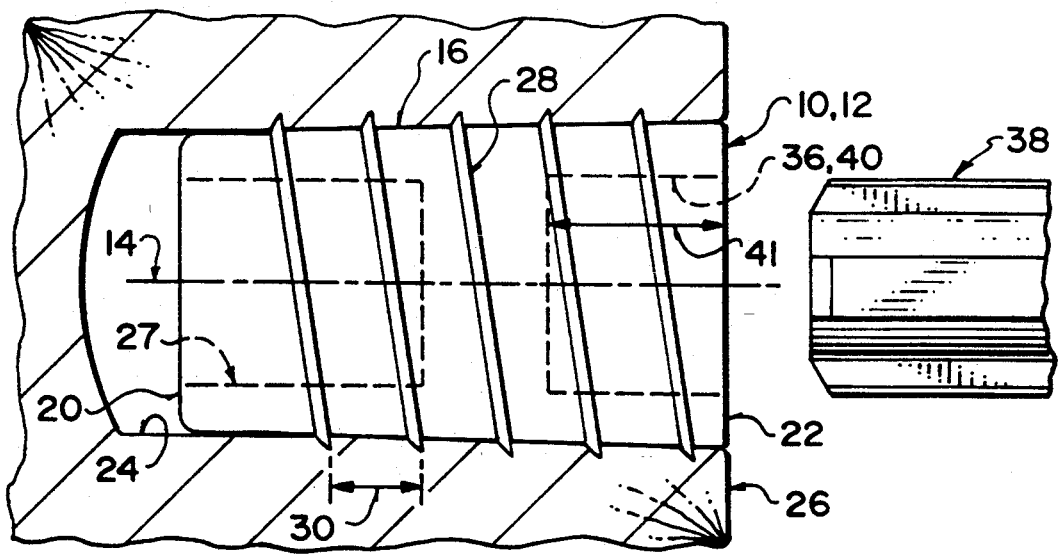
FIG. 1 is a side elevation of a first embodiment of the invention, some internal detail being shown in broken outline, the invention being shown installed in an opening in a wooden structure, a portion of a driver being shown fragmented.
Figure 2:
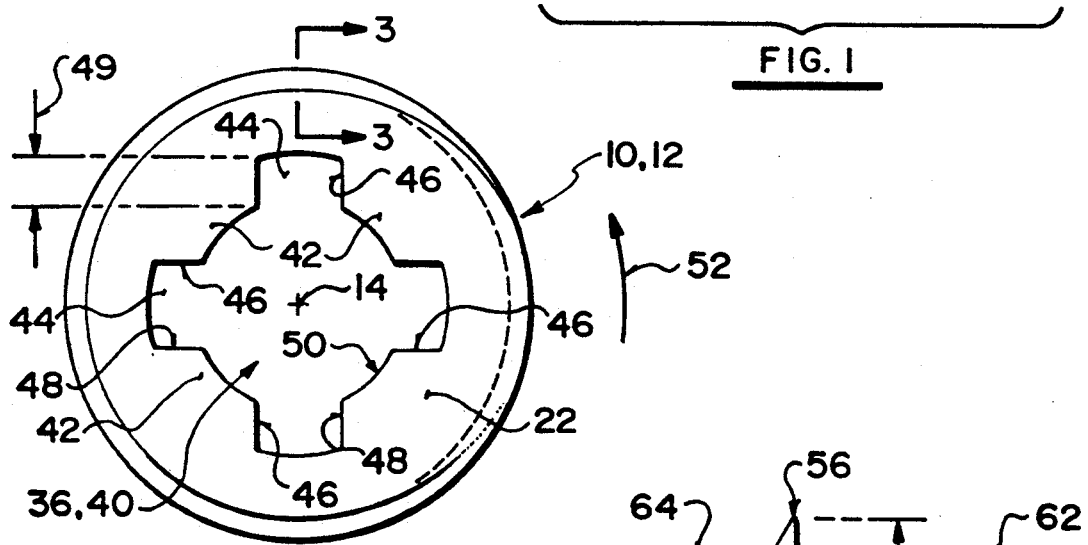
FIG. 2 is an end view of the first embodiment of FIG. 1.
Figure 3:
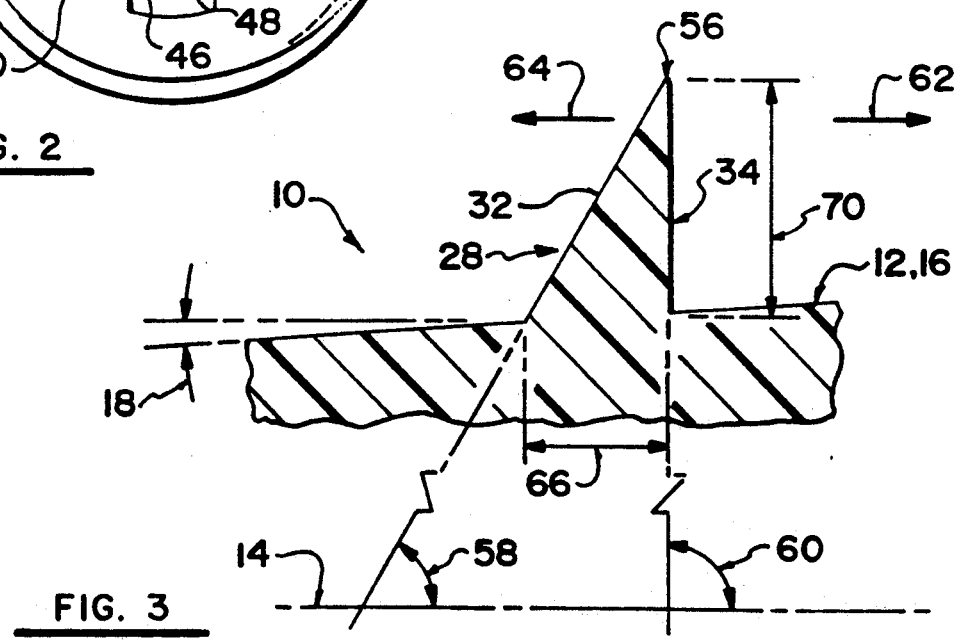
FIG. 3 is a fragmented section taken on line 3—3 of FIG. 2 showing a portion of a thread portion and a portion of a recess adjacent an outer end thereof.
Figure 4:
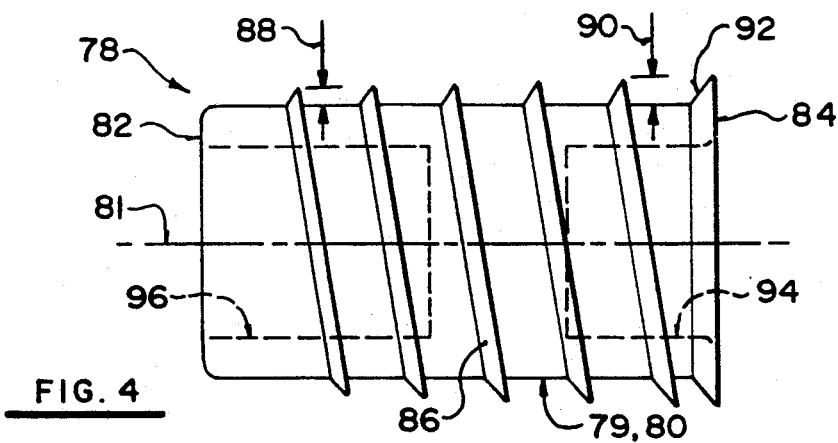
FIG. 4 is a side elevation of a second embodiment of the invention, some internal detail being shown in broken outline.

FIGS. 1 through 3

Referring to FIG. 1, a first embodiment 10 of a sealing plug according to the invention has a body portion 12 having a central longitudinal axis 14. The body has a periphery 16 which is a portion of a shallow angled cone having a half angle 18 of approximately 1.3 degrees. However, the angles 18 can vary between 0.6 degrees and 3.6 degrees.

The body has inner and outer end portions 20 and 22 respectively, the inner end portion having a smaller diameter than the outer end portion to facilitate entry into an opening 24 in a wood structure 26, for example, a utility pole. The opening 24 is drilled with a parallel sided drill and thus is generally cylindrical, and the inner end portion 20 of the plug has short parallel-sided unobstructed section with a diameter equal or slightly less than diameter of the opening 24 to facilitate entry into the opening. The plug 10 has an opening 27 adjacent the inner end which serves no other function apart from reducing volume of material required to produce the plug.

The plug 10 include a thread portion 28 which is helically wound around the periphery 16 extending from a position adjacent the inner end portion and extending outwardly to the outer end portion. Adjacent turns of the thread portion are spaced apart at a thread pitch or lead 30, which is equal along the length of the plug. For a single start thread as shown, the pitch 30 or lead represents the distance the plug moves axially during one revolution of the plug within the opening 24. Preferably, the pitch 30 is 6.35 millimetres (0.25 inches), but can be between 4.23 millimetres (0.17 inches) and 8.46 millimetres 0.33 inches). Thus, for a plug having a thread length of 34.92 millimetres (1.375 inches), between 5 and 6 turns are required to unscrew the plug from the opening as would be described. The thread portion has a leading face 32 facing towards the inner end portion 20, and a trailing face 34 facing towards the outer end portion 22. Further details of the thread form are described with reference to FIG. 3. Clearly, a multi-start thread can be substituted if desired.

The plug also includes a driver engagement means 36 located adjacent the outer end portion 22. The driver engagement means is for co-operating with a complementary driver 38, shown fragmented and aligned with, but removed from, the driver engagement means.

As best seen in FIG. 2, the driver engagement means 36 is a recess 40 having an axial depth 41, and a plurality of generally radially disposed projections, severally 42, separated from each other by parallel-sided gaps 44. Thus, each projection has a pair of generally radially disposed faces 46 and 48, a face 48 of one projection being disposed oppositely to and generally parallel to a face 46 of an adjacent projection. Each projection 42 has a concave inner face 50 disposed concentrically with the axis 14, and adapted to prevent engagement with drivers of smaller size. The driver 38 has a cross-section complementary to the recess 42. The thread as shown in FIG. 1 is a right hand thread, and thus, the plug is rotated counter-clockwise per arrow 52 to unscrew it from the opening 24. Consequently, the faces 48 of the projections 42 serve as driven faces for tangs of the driver 38, whereas the faces 46 are not subjected to appreciable forces during unscrewing. Thus, it can be seen that the recess has a recess surface defined in part by a plurality of generally radially disposed projections, with each projection having at least one generally radially disposed driven face. In effect, the recess has diametrically opposed shoulder portions to accept driving faces of the driver, each shoulder portion providing a driven face having an axial length equal to the axial depth 41.

Referring to FIG. 3, the face 46 of the projection 42 has a radial width 49, which is equal to width of the driven face 48. A ratio of driven face radial width 49 to driven face axial length 41 (FIG. 1) of 9:1 is suitable, but the ratio could be between 16:1 and 3:1.

The thread portion 28 is of generally triangular cross section, and the leading and trailing faces 32 and 34 intersect at a vertex 56 or outermost portion of the thread. The leading face 32 is inclined to the longitudinal axis 14 at a leading angle 58, and the trailing face is inclined to the longitudinal axis at a trailing angle 60. The leading angle 58 is shallower than the trailing angle to facilitate driving the plug into the opening, and to serve as a "barb" to engage a sidewall of the opening to resist axial movement of the plug with respect to the opening in an outwards direction. As shown, the leading angle 58 is 60 degrees, but it could be between 80 degrees and 45 degrees to the longitudinal axis. The trailing angle 60 is shown as 90 degrees, but it could be between 70 degrees and 135 degrees to the longitudinal axis. As will be described, the thread portion is flexible, and has a directional flexibility so as to deflect relatively more easily towards the outer end portion shown as an arrow 62, than towards the inner end portion, shown as an arrow 64.

The thread portion has a root width 66 as measured generally axially along the periphery within a longitudinal plane containing the longitudinal axis 14. The thread pitch 30 of FIG. 1 or spacing between adjacent turns of the thread portion within the longitudinal plane is approximately six times greater than the root width 66 of FIG. 3 of the thread portion, but could be between two and thirty times greater than the root width. The thread portion 28 has a constant thread depth 70 as measured radially from the periphery 16 to the outermost portion or vertex 56 of the thread. The root width 66 is approximately one half of the thread depth, but could be between one half and twice the thread depth. Ratio of overall diameter of the thread portion to diameter of the body portion at a specific axial location is preferably between 1.05 to 1.15, with a preferred value of about 1.07.

OPERATION

Referring to FIG. 1, the opening 24 in the wooden structure is a previously drilled opening from a previous treatment, or can be a new opening. Wood preservative is first injected into the opening in the normal manner so as to penetrate the wood, and the plug 10 is initially inserted adjacent the opening, with the inner end portion 20 being a snug fit within the opening. A common hammer is then used to drive the plug axially into the opening until the outer end portion 22 in generally flush with the outer surface of the wood structure. While the plug is being driven into the opening, the portions of the thread form adjacent the vertex deflect towards the outer end portion, thus reducing the effective diameter of the plug, and facilitating movement of the plug further into the opening. Resilience of the body portion and the wood grain in the opening provide a tight fit for the plug, essentially eliminating any chances of inadvertent loss of the plug from the opening. Ends of the wood grain in the sidewall of the opening accept the vertices of the thread portions as "barbs" further reducing chances of inadvertent loss of the plug. There is no requirement for rotating the plug to assist in driving the plug into the opening.

After several years of treatment, the plug can be removed by inserting the driver 38 into the recess, and rotating the driver anti-clockwise 5 or 6 times so as to remove the plug from the opening. In contrast to driving the plug into the opening, when unscrewing the plug from the opening the thread form remains relatively undistorted, permitting the thread form to provide a self tapping thread within the opening, to assist withdrawal of the plug from the opening.

ALTERNATIVES

FIG. 4

A second embodiment 78 of the plug according to the invention has body portion 79 having a periphery 80 a central longitudinal axis 81, and inner and outer end portions 82 and 84 respectively. In contrast with the shallow angled, generally conical periphery 16 of the first embodiment, the periphery 80 of the second embodiment is of constant circular cross-section, that is the body 79 is non-tapering or cylindrical. The body has a thread portion 86 which is helically wound around the periphery, the thread portion having a thread depth 88 adjacent the inner end portion which is smaller than a thread depth 90 adjacent the outer end portion 84. Thus, in contrast with the constant thread depth of the plug 10 of FIGS. 1 through 3, the thread portion 86 itself tapers downwardly from the outer end portion 84 to the inner end portion 82 and thus provides an effective shallow conical periphery.

Furthermore, in contrast with the end portion of the first embodiment 10, the end portion 84 of the second embodiment 78 has a circumferential, non-helical annular sealing ring 92 adjacent the outer end. The ring 92 has a triangular cross-section which resembles the thread form of FIG. 3 and extends outwardly further than an adjacent outermost thread portion to provide a maximum diameter of the plug. This can assist in providing a more positive seal to the opening, particularly when the opening is drilled into a flat surface, as opposed to a curved surface of the common generally circular cross-sectioned utility pole.

Similarly to the first embodiment, the outer end portion 84 of the second embodiment 78 has a driver engaging means 94, which can be a recess having a periphery similar to that shown in FIG. 2, or alternatively can be similar to that shown in Figure to be described. The inner end portion 82 can similarly be provided with a opening 96 to reduce volume of material used. Clearly, the sealing ring 92 could be added to the plug 10 of FIGS. 1 through 3.

Figure 5:
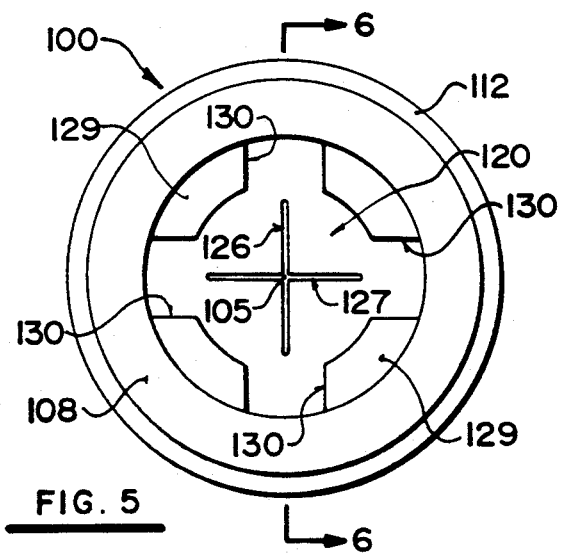
FIG. 5 is an end view of a third embodiment of the invention fitted with a seal having a closable opening therein.
Figure 7:
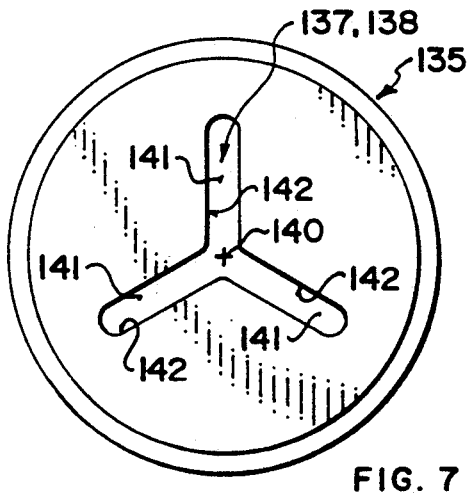
FIG. 7 is an end view of a fourth embodiment showing an alternative driver engaging means.
Figure 6:
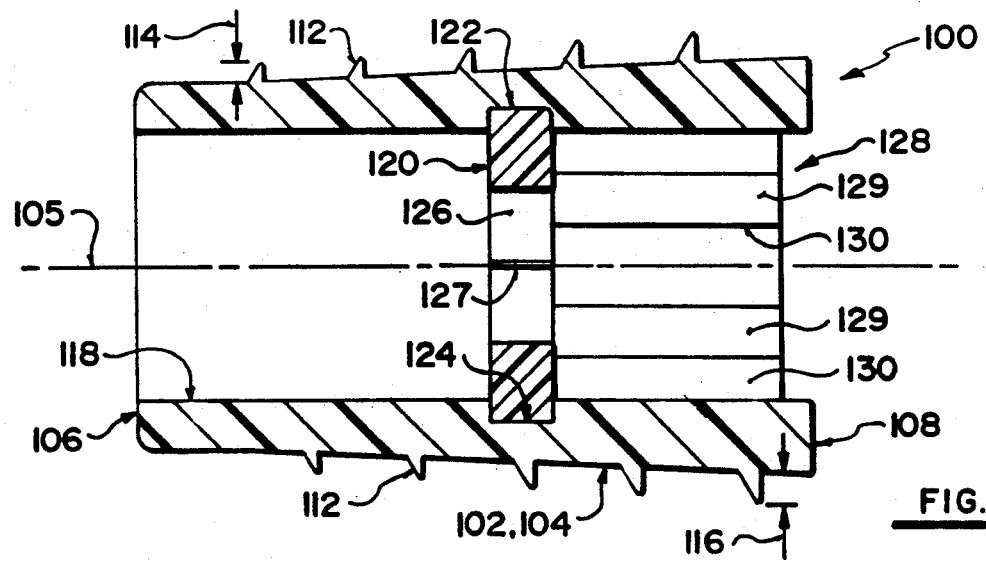
FIG. 6 is a simplified longitudinal section through the third embodiment, as seen from line 6—6 of FIG. 5.

FIGS. 5 and 6

A third embodiment 100 of a plug according to the invention has a body portion 102 having a periphery 104, a central longitudinal axis 105, and inner and outer end portions 106 and 108 respectively. Similarly to the first embodiment, the periphery 104 is partially conical, so that the inner end portion 106 has a smaller diameter than the outer end portion 108. Preferably, a short forwardmost portion of the inner end portion 106 is unobstructed, i.e. free of thread, and has a parallel section which facilitates supporting the plug in the opening so as to be axially aligned therewith prior to hammering. The body 102 has a thread portion 112 which is helically wound around the conical portion of the periphery, the thread portion having a thread depth 114 adjacent the inner end portion which is smaller than a thread depth 116 adjacent the outer end portion 108. Thus, similarly to the second embodiment, the depth of the thread portion 112 tapers downwardly from the outer end portion 108 to the inner end portion 106, which provides a secondary conical profile in addition to the conical profile of the periphery 104.

In contrast to the previous embodiments, the body 102 has a longitudinal opening 118 extending between the inner and outer end portions thereof. A penetrable resilient sealing means 120 extends across sidewalls of the opening so as to seal the opening when closed. The sealing means 120 is an elastomeric disk having a periphery 122 which is received within a complementary annular groove 124 within the sidewall of the longitudinal opening 118 of the body. The sealing means has a pair of diametrically disposed slits 126 and 127 which intersect each other perpendicularly adjacent the longitudinal axis 105 of the body. The pair of intersecting slits provides an X-shaped self-sealing opening within the sealing means, in which resilience of the sealing means maintains the opening closed until penetrated by a hollow probe (not shown) or other means of delivering a preservative substance to the longitudinal opening 118.

A portion of the longitudinal opening 118 adjacent the outer end portion 108 serves as a recess for a driving engagement means 128, which has a cross section generally similar to the first embodiment as shown in FIG. 2. Thus, the driving engagement means 128 has a recess defined in part by plurality of generally radially disposed projections 129, each projection having at least one generally radially disposed driven face 130. The projections 129 have outer portions disposed axially inwardly of the end portion 108 to reduce chances of impact damage from the hammer.

FIG. 7

A fourth embodiment 135 of a plug according to the invention has an alternative engaging means 137 adjacent an outer end thereof. The engaging means 137 has a generally Y-shaped recess 138 disposed symmetrically about a central longitudinal axis 140 of the body. Thus, the recess 138 has three radial slots 141 having generally radially disposed driving faces 142 extending outwardly from the axis. The recess 138 accepts a complementary cross-sectioned driver, not shown.

Clearly, other shapes of recesses can be devised to provide driven faces to provide sufficient material and strength to resist torque from the driving means. It has been found that in general, square cross-sections or hexagonal cross-sections do not provide sufficient strength to resist torque when extracting a plug with an integral thread of adequate resilience. Consequently, driven faces of reasonably large cross-sectional area are required to resist forces, and have a shape that require especially designed driver or removal tool. Clearly, a conventional diametrical slot for a conventional screwdriver blade would be undesirable as it would permit unauthorized persons to tamper with the plug. Similarly, projections extending axially outwardly from the outer end of the plug are undesirable as unauthorized persons could more easily grip such projections with plier-type gripping devices. Preferably, the recess in the end face should be relatively small, so as to reduce accumulation of dirt and other contaminants when the plug is located closely adjacent the ground.

The engaging means as shown in FIGS. 2 and 5 are defined as four-point star type recesses, and it is considered that five-point or six-point star type recesses would similarly function, while increasing the difficulty of unauthorized tampering.

MATERIALS

Preferably, the body portion and thread portion are integral and injection moulded from a resilient plastic, such as high density polyethylene having a Shore Durometer Hardness of 65 measured on the D Scale, but it can be between 50 and 70. The sealing means 120 of FIGS. 5 and 6 can be a thermoplastic material having a Shore Durometer Hardness as measured on the D Scale within a range between 40 and 60. A suitable thermoplastic polyurethane elastomer has been found, sold under the registered trademark TEXIN, as manufactured by Mobay Corporation of the U.S.A. A wide diversity of physical properties for this compound can be obtained, and it has been found that the Mobay TEXIN type referred to as 355 DH-1H7, having a Shore Durometer Hardness of 55 on the D Scale is suitable.

By suitable selection of materials, it might be possible to find a material which has the sufficient strength for thread portions, as well a sufficient resilience for the sealing means, and thus permit the embodiment of FIGS. 5 and 6 to be fabricated from one piece of material. However, until such material has been found, it is probably simpler to fabricate the body from a tough, high density polyethylene, and manufacture the sealing means from a resilient polyurethane as described.

I claim:

1. A plug comprising:
   (a) a body portion having a central longitudinal axis, inner and outer end portions, and a periphery of generally circular cross-section extending between the end portions,
   (b) at least one flexible thread portion helically wound around the periphery, the thread portion having a leading face facing towards the inner end portion, and a trailing face facing towards the outer end portion, the leading face and trailing face being inclined to the longitudinal axis at a leading angle and a trailing angle respectively, the leading angle being shallower than the trailing angle, the thread portion having a directional flexibility so as to deflect relatively more easily towards the outer end portion than towards the inner end portion, the thread portion having a root width as measured generally axially along the periphery within a longitudinal plane containing the longitudinal axis, spacing between adjacent turns of the thread portion within the longitudinal plane being between two and ten times greater than the root width of the thread portion,
   the thread portion has a thread depth as measured radially from the periphery to an outermost portion of the thread, the thread depth being greater at the outer end portion of the plug than at the inner end portion, and
   (c) driver engagement means for cooperating with a driver located adjacent the outer end portion.

2. A plug as claimed in claim 1, in which:
   (a) the thread portion has a root width as measured generally axially along the periphery within a longitudinal plane containing the longitudinal axis,
   (b) the root width being between one half and twice the thread depth.

3. A plug as claimed in claim 1, in which:
   (a) the periphery of the body portion is a portion of a shallow-angled cone.
   (b) the inner end portion is of smaller diameter than the outer end portion.

4. A plug as claimed in claim 1, in which:
   (a) the leading angle is between 80 degrees and 45 degrees to the longitudinal axis.
   (b) the trailing angle is between 70 degrees and 135 degrees to the longitudinal axis.

5. A plug as claimed in claim 1, in which:
   (a) the driver engagement means is a recess within the outer end portion, the recess having at least one pair of diametrically opposed shoulder portions to accept driving faces of the driver.

6. A plug as claimed in claim 5, in which:
   (a) the recess has a recess surface defined in part by a plurality of generally radially disposed projections, each projection having at least one generally radially disposed driven face.

7. A plug as claimed in claim 1, further including:
   (a) a circumferential, non-helical annular sealing ring adjacent the outer end portion, the ring extending outwardly further than an adjacent thread portion to provide a maximum diameter of the plug, the sealing ring having a leading face inclined at a leading angle generally similar to the leading angle of the thread portion.

8. A plug as claimed in claim 1, in which:
   (a) the body has a longitudinal opening extending between the inner and outer end portions thereof,
   (b) a penetrable resilient sealing means extends across the opening so as to seal the opening when closed.

9. A plug as claimed in claim 7, in which:
   (a) the sealing means has a self-sealing opening therein in which resilience of the sealing means maintains the opening closed.

10. A plug as claimed in claim 9, in which:
    (a) the opening in the sealing means comprises a pair of diametrically disposed slits intersecting adjacent the longitudinal axis of the body.

11. A plug as claimed in claim 1, in which:
    (a) the body and thread portions are integral and fabricated from a resilient plastic material.

12. A plug as claimed in claim 1, in which:
    (a) ratio of overall diameter of the thread portion to diameter of the body portion at a specific axial location is between 1.05 and 1.15.

13. A plug as claimed in claim 8, in which:
    (a) the body and thread portions are integral and fabricated from a resilient thermo-plastic material,
    (b) the sealing means is fabricated from a plastic material which has a resilience equal to or greater than the plastic material of the body.

14. A plug as claimed in claim 13, in which:
    (a) the body is fabricated from a thermo-plastic material having a Shore Durometer Hardness as measured on the D Scale within a range of 50 through 70,
    (b) the sealing means is fabricated from a thermo-plastic material having a Shore Durometer Hardness as measured on the D Scale within a range of 40 through 60.

15. A plug as claimed in claim 6, in which:
    (a) the driven face of each projection has an axial length and a radial width, in which ratio of radial width to axial length is between 16:1 and 3:1.

16. A plug comprising:

(a) a body portion having a central longitudinal axis, inner and outer end portions, and a periphery of generally circular cross-section extending between the end portions, (b) at least one flexible thread portion helically wound around the periphery, the thread portion having a leading face facing towards the inner end portion, and a trailing face facing towards the outer end portion, the leading face and trailing face being inclined to the longitudinal axis at a leading angle and a trailing angle respectively, the leading angle being shallower than the trailing angle, the thread portion having a directional flexibility so as to deflect relatively more easily towards the outer end portion than towards the inner end portion, the thread portion having a root width as measured generally axially along the periphery within a longitudinal plane containing the longitudinal axis and a thread depth as measured radially from the periphery to an outermost portion of the thread, the root width being between one half and twice the thread depth, and the thread depth being greater at the outer end portion of the plug than at the inner end portion, and (c) driver engagement means for cooperating with a driver located adjacent the outer end portion.

17. A plug as claimed in claim 16 in which:
(a) the periphery of the body portion is a portion of a shallow-angled cone, and
(b) the inner end portion is of smaller diameter than the outer end portion.

18. A plug as claimed in claim 16 in which:
(a) the body has a longitudinal opening extending between the inner and outer end portions thereof, and
(b) a penetrable, resilient sealing means extends across the opening so as to seal the opening when closed.

19. A plug as claimed in claim 18 in which:
(a) the body and thread portions are integral and fabricated from a resilient thermo-plastic material, and
(b) the sealing means is fabricated from a resilient plastic material which has a resilience equal to or greater than resilience of the plastic material of the body.

20. A plug as claimed in claim 16 in which:
(a) ratio of overall diameter of the thread portion to diameter of the body portion at a specific axial location is between 1.05 and 1.15.

21. In combination, a wood structure having an opening defined by a sidewall of generally circular cross-section, and a plug inserted in the opening, the plug comprising:
(a) a body portion having a central longitudinal axis, inner and outer end portions, and a periphery of generally circular cross-section extending between the end portions,
(b) at least one flexible thread portion helically wound around the periphery, the thread portion having a leading face facing towards the inner end portion, and a trailing face facing towards the outer end portion, the leading face and trailing face being inclined to the longitudinal axis at a leading angle and a trailing angle respectively, the leading angle being shallower than the trailing angle, the thread portion having a directional flexibility so as to deflect relatively more easily towards the outer end portion than towards the inner end portion, the thread portion being deformed by the side wall of the opening to be deflected towards the outer end portion, so as to act as barbs to assist in retaining the plug within the opening.

the thread portion has a thread depth as measured radially from the periphery to an outermost portion of the thread, the thread depth being greater at the outer end portion of the plug than at the inner end portion, and (c) driver engagement means for cooperating with a driver located adjacent the outer end portion.

22. A combination as claimed in claim 21 in which:
(a) the opening in the wood structure is generally cylindrical, and
(b) the periphery of the body portion of the plug is a portion of a shallow-angled cone in which the inner end portion is of smaller diameter than the outer end portion.

23. A combination as claimed in claim 21 in which:
(a) the thread portion has a root width as measured generally axially along the periphery within a longitudinal plane containing the longitudinal axis, and
(b) spacing between adjacent turns of the thread portion within the longitudinal plane is between two and ten times greater than the root width of the thread portion.

24. A combination as claimed in claim 21 in which:
(a) ratio of overall diameter of the thread portion to diameter of the body portion at a specific axial location is between 1.05 and 1.15.

25. A combination as claimed in claim 21, in which the plug is further characterized by:
(a) the body having a longitudinal opening extending between the inner and outer end portions thereof,
(b) the body and thread portions being integral and fabricated from a resilient plastic material, so that the body is compressed and deflects inwardly when driven into the opening in the wood structure, and
(c) a penetrable, resilient sealing means extending across the opening so as to seal the opening when closed, the sealing means being fabricated from a plastic material which has a resilience equal to or greater than the plastic material of the body, and has a thickness sufficient to resist buckling under compression so that as the body compresses due to force from the side walls of the opening, the resilient sealing means deflects to augment sealing of the opening therein.

26. A combination as claimed in claim 21 in which the plug further includes:
(a) a circumferential, non-helical annular sealing ring adjacent the outer end portion, the ring extending outwardly further than an adjacent thread portion to provide a maximum diameter of the plug, the sealing ring having a leading face inclined at leading angle generally similar to leading angle of the thread portion and being compressed by sidewall of the opening.

* * * * *